(12) United States Patent
Khim

(10) Patent No.: US 10,184,453 B1
(45) Date of Patent: Jan. 22, 2019

(54) SYSTEM FOR EXTRACTING ENERGY FROM WIND AND THERMAL GRADIENTS

(71) Applicant: Kyung N. Khim, San Francsico, CA (US)

(72) Inventor: Kyung N. Khim, San Francsico, CA (US)

(*) Notice: Subject to any disclaimer, the term of this patent is extended or adjusted under 35 U.S.C. 154(b) by 0 days.

(21) Appl. No.: 15/701,783

(22) Filed: Sep. 12, 2017

Related U.S. Application Data (62) Division of application No. 14/670,110, filed on Mar. 26, 2015, now Pat. No. 9,784,242, which is a division of application No. 13/757,836, filed on Feb. 3, 2013, now Pat. No. 9,038,385.

(51) Int. Cl.
  *F03D 9/30* (2016.01)
  *F03D 80/00* (2016.01)
  *H02J 3/04* (2006.01)
  *F01D 15/10* (2006.01)

(52) U.S. Cl.
  CPC ............... *F03D 9/30* (2016.05); *F01D 15/10* (2013.01); *F03D 80/00* (2016.05); *H02J 3/04* (2013.01)

(58) Field of Classification Search
  CPC .......................................................... F03D 9/30
  See application file for complete search history.

(56) References Cited

U.S. PATENT DOCUMENTS

| | | |
|---|---|---|
| 385,674 A | 7/1888 | Lockwood |
| 1,314,232 A | 8/1919 | Wohr |
| 3,902,072 A | 8/1975 | Quinn |
| 3,920,354 A | 11/1975 | Decker |
| 3,922,012 A | 11/1975 | Herz |
| 4,303,835 A | 12/1981 | Bair |
| 4,494,007 A | 1/1985 | Gaston |
| 5,182,458 A | 1/1993 | McConachy |
| 5,381,048 A | 1/1995 | Baird |
| 5,694,774 A | 12/1997 | Drucker |
| 6,749,399 B2 | 6/2004 | Heronemus |
| 7,696,635 B2 | 4/2010 | Boone |
| 7,862,290 B2 | 1/2011 | Diederich |
| 8,210,817 B2 | 7/2012 | Iskrenovic |
| 8,338,977 B2 | 12/2012 | Lee et al. |
| 2004/0228729 A1* | 11/2004 | Migler .............. F03D 3/067 416/119 |
| 2006/0016182 A1 | 1/2006 | Comandu et al. |

(Continued)

*Primary Examiner* — Daniel Puentes
(74) *Attorney, Agent, or Firm* — David Pressman (57) ABSTRACT

An inverted funnel-shaped columnar tower (115) includes a window region (120), a heat absorbing surface (130), an air entrance (116) and exit (117). Solar energy passes through the window region and heats the heat absorbing surface. A plurality of fans (145), each connected to a generator (150), are suspended within the tower and extract energy from convectively rising air, generating electricity. A fan (160) outside the tower intercepts wind and turns an internal fan (145') that aids the convective flow, providing a self-starting feature. A plurality of rotors (100) with wings (705) are connected in groups to generators (725) and all are arranged adjacent the tower. The rotors intercept wind energy and deliver it to the generators for conversion to electricity. The rotors include a flap (800) that predetermines the direction of rotation of the rotor, providing a second self-starting feature. The convection and wind-capture functions operate independently.

10 Claims, 4 Drawing Sheets

(56) References Cited

U.S. PATENT DOCUMENTS

| | | |
|---|---|---|
| 2008/0093861 A1 | 4/2008 | Friesth et al. |
| 2009/0212570 A1 | 8/2009 | Le et al. |
| 2010/0233919 A1 | 9/2010 | Ersoy |
| 2011/0070068 A1 | 3/2011 | Cumings et al. |
| 2011/0074164 A1 | 3/2011 | Kobayashi |
| 2011/0173980 A1 | 7/2011 | Yangpichit |
| 2011/0182733 A1 | 7/2011 | Howard |
| 2011/0193512 A1 | 8/2011 | Singhal et al. |
| 2011/0215583 A1 | 9/2011 | Lee et al. |
| 2012/0020788 A1 | 1/2012 | Lucy |
| 2012/0031119 A1 | 2/2012 | Ahmad et al. |
| 2012/0049622 A1 | 3/2012 | Young et al. |
| 2012/0091727 A1 | 4/2012 | Tsitron |
| 2012/0121379 A1 | 5/2012 | Chio |
| 2012/0139249 A1 | 6/2012 | Peng |
| 2012/0175882 A1 | 7/2012 | Sterling et al. |

\* cited by examiner

SYSTEM FOR EXTRACTING ENERGY FROM WIND AND THERMAL GRADIENTS

CROSS-REFERENCE TO RELATED APPLICATION

This application is a Division of application Ser. No. 14/670,110, Filed 2015 Mar. 26, now U.S. Pat. No. 9,784,242, Granted 2017 Oct. 10. Said application Ser. No. 14/670,110 is in turn a Division of Parent application Ser. No. 13/757,836, Filed 2013 Feb. 3, now U.S. Pat. No. 9,038,385, Granted 2015 May 26.

BACKGROUND

Prior Art

Rising fuel prices resulting from decreased fossil fuel resources and the liabilities associated with coal and nuclear power are placing increased emphasis on the use of clean, safe, and renewable (non-exhaustible) energy sources. Global warming provides additional impetus to find sources of energy that do not pollute the atmosphere. Thus numerous systems are available today that extract energy from renewable sources, including wind, solar, hydroelectric, geothermal, bioenergy, and ocean currents.

The following is a list of some possibly relevant prior art that shows prior-art systems that extract energy from wind and solar sources. Some references extract energy from wind only, others from solar only, and some from a combination of wind and solar. The list below is divided into these three categories. Following this list I provide a discussion of these references.

| Pat. or Pub. Nr. | Kind Code | Issue or Pub. Date | Patentee or Applicant |
|---|---|---|---|
| Systems That Extract Energy From Wind | | | |
| 385,674 | B1 | 1888 Jul. 3 | Lockwood |
| 1,314,232 | B1 | 1919 Aug. 26 | Wohr |
| 3,902,072 | B1 | 1975 Aug. 26 | Quinn |
| 3,920,354 | B1 | 1975 Nov. 18 | Decker |
| 3,922,012 | B1 | 1975 Nov. 25 | Herz |
| 4,303,835 | B1 | 1981 Dec. 1 | Bair |
| 4,494,007 | B1 | 1985 Jan. 15 | Gaston |
| 5,182,458 | B1 | 1993 Jan. 26 | McConachy |
| 6,749,399 | B2 | 2004 Jun. 15 | Heronemus |
| 7,696,635 | B2 | 2010 Apr. 13 | Boone |
| 7,862,290 | B2 | 2011 Jan. 4 | Diederich |
| 2008/0093861 | A1 | 2008 Apr. 24 | Friesth et al. |
| 2010/0233919 | A1 | 2010 Sep. 16 | Ersoy |
| 2011/0070068 | A1 | 2011 Mar. 24 | Cumings et al. |
| 2012/0091727 | A1 | 2012 Apr. 19 | Tsitron |
| 2012/0121379 | A1 | 2012 May 17 | Chio |
| 2012/0175882 | A1 | 2012 Jul. 12 | Sterling et al. |
| Systems That Extract Energy From Solar | | | |
| 5,381,048 | B1 | 1995 Jan. 10 | Baird |
| Systems That Extract Energy From Wind and Solar | | | |
| 8,210,817 | B2 | 2012 Jul. 3 | Iskrenovic |
| 2006/0016182 | A1 | 2006 Jan. 26 | Comandu et al. |
| 2011/0215583 | A1 | 2011 Sep. 08 | Lee et al. |
| 2012/0020788 | A1 | 2012 Jan. 26 | Lucy |
| 2012/0031119 | A1 | 2012 Feb. 09 | Ahmad et al. |
| 2012/0049622 | A1 | 2012 Mar. 1 | Young et al. |

Lockwood shows a windmill comprising a plurality of orientable sails that are suspended between a rotatable assembly of upper and lower spokes. The sails each pivot about a first axis. The assembly of spokes rotates about a second axis, much like two spoked wheels. A vane, resembling a weather vane, rotates independently about the second axis and orients itself so that its leading end faces into the wind. As the spoke assembly rotates about the second axis, a rack-and-pinion gear system connected to the vane and the sails continuously reorients the sails about the first axis with respect to the orientation of the vane in such a way as to maximize the extraction of energy from the wind by the spoke assembly that holds the sails. Although its principle of operation is straightforward, this system is complex and contains many parts.

Wohr shows a vertically-oriented windmill having a plurality of movable sails. The sails are attached to an assembly of upper and lower spoked wheels that rotate together about a central axis. Each sail is rotatably suspended between the upper and lower spokes along one edge so that it is free to swing and rotate about that same edge. A cam arrangement limits the range of rotation of the sail so that on one side of the spoke assembly the flat side of the sails is constrained to face the approaching wind, while on the opposite side of the spoke assembly the flat side of the sails is parallel to the flow of the wind. Sails located between these two extremes assume intermediate orientations. A cam-and-spring assembly permits the sails with their flat sides facing the wind to swing freely, thereby avoiding damage to the windmill in high-wind conditions. As with Lockwood, this system is complex and contains many parts.

Quinn shows a large, vertically-oriented windmill for generating electricity. Upper and lower horizontally disposed circular members are secured together and rotate on a common axis. The lower member is a platform that is supported from below by a housing. A plurality of vertical blades are interposed between the two members. Each blade includes a central pivot about which it can pivot. A weather vane provides wind direction information to an electronic circuit. As the members rotate about their axis, an electronically-controlled arrangement of gears urges the vanes to pivot so that their flat sides face the wind on one side of the platform and are perpendicular to the wind on the opposite side, extracting energy from the wind. A central shaft is connected to a generator, producing electricity. This system is complex, large, and contains many parts that contribute to its central rotating unit.

Decker shows a vertically-oriented windmill. A plurality of spokes hold a plurality of flaps that are suspended at their upper edge and allowed to swing between a horizontal position and a vertical position. In the vertical position the flaps block the wind, causing the windmill to turn; in the horizontal position wind passes through between the flaps, exerting no appreciable force. This combination produces a torque about the axis of the spokes, causing the windmill to rotate. The axis is connected to a generator for the production of electricity. As with all the previous windmills, Decker's contains a large number of parts in its one rotating unit.

Herz shows a submersible power generator for converting the energy of deep ocean currents, tidal flows, river channel currents, and the like to electricity. A plurality of impeller blades are hingedly attached to a plurality of spokes that are connected to a rotatable shaft that drives a generator. Each blade intercepts the water current in a first rotational position, and trails freely in a second rotational position. In addition, when the blade is moving from the second rotational position to the first rotational position, the blade swings radially outward against a stop, thereby imparting additional momentum to the blade as it turns. While Herz's apparatus operates in a manner similar to the windmills described above, it is designed for use under water. Its basic concept is an improvement over the large systems described above in that each rotating spoked part comprises a small number of components so that a plurality of spoked parts can be combined for additional output, if desired.

Bair shows a wind powered generator that rotates about a vertical axis. A plurality of vertically disposed airfoils are each pivotable around a vertical axis. An electro-mechanical system orients the airfoils to optimally extract energy from the wind. As before, a large number of individual parts comprise a single rotating unit. In addition, this system is complex.

Gaston shows a wind machine that is similar to Wohr and Quinn. A plurality of vertical blades are suspended between two spoked wheels. A vane senses the direction of the wind and orients the blades for optimal extraction of energy from the wind. A central shaft is connected to the spoked wheels and to a generator for generating electricity. While Gaston's system is simpler than some of those discussed above, it is still complex.

McConachy shows a high-altitude tower wind generating system. A plurality of vertical, cascaded mast sections are connected by articulated joints. A plurality of propeller-like rotors are mounted on the mast sections. A generator is connected to each rotor. An arrangement of guy wires ensures that the tower will remain intact in high-wind conditions. This system is primarily concerned with a single mast construction that is supported by a dynamic guy wire tensioning system.

Heronemus shows a vertical array wind turbine comprising an array of propeller-like wind turbine rotors mounted on a tower which, in turn, is rotatably secured to a fixed pole. The tower rotates so that the rotors face into the wind. The need to yaw the entire tower is a critical part of this system. A platform at the base of the tower rests on bogies, i.e., a plurality of low, sturdy carts, with pneumatic tires. Guy cables between the tower and the base of the tower keep the tower upright, however the diameter of the base of the tower is determined by the outward reach of the guy wires. When the system is exposed to the wind, the fixed pole and the base of the tower must provide a restoring torque to counter the torque applied to the tower and rotors. The limited outreach of the guy cables and the torque on the tower causes most of the torque to occur at the base of the pole. Thus an extraordinarily strong mount is required for the pole. The use of pneumatic tires poses an additional risk since the tires will undoubtedly require replacement over time.

Boone shows a wind turbine comprising a vertically rotating shaft and a plurality of horizontally disposed, box-shaped wind catchment vanes. The boxes are mounted at a first end of the shaft and a generator is mounted at the other end. The boxes are oriented so that a line connecting the top and bottom is horizontal, i.e., the box is tipped 90-degrees on its side. At the bottom of the box is a flap. The flap pivots about its top edges, opening and closing the bottom of the box under predetermined conditions. A flap is free to pivot upward when urged by the wind striking the outside, bottom of the box, leaving the box open to pass the wind with little resistance. When the box is oriented so that wind enters its top, the flap inside is urged downward against the bottom of the box where it is restrained from pivoting further, thereby causing the box to obstruct the flow of air. The asymmetry produced by an open box on one side of the shaft and a closed box on the other side of the shaft produces a torque that causes the shaft to turn. The flaps in boxes at intermediate positions relative to the wind direction assume intermediate positions between open and closed.

Diederich shows a fluid energy-harnessing apparatus with a plurality of movable wind foil vanes that move around a track. The apparatus is suitable for use in water or in air. The vanes are positioned to resist the flow of advancing wind on one side of the track, and to pass the flow of advancing wind on the other. The resultant forces cause the vanes to move around the track. The vanes are connected to a chain drive that turns a shaft connected to a generator. This system is complex mechanically and requires many parts.

Friesth shows a multi-turbine airflow amplifying generator. A plurality of generating modules are affixed to a tower. Each module contains two turbines. Each turbine employs two rotors that are coaxially aligned by a shaft connected to an in-line generator. A first rotor is contained in a proximal channel with a leading portion having decreasing radius toward the first rotor, thereby adding to the air flow to a second rotor. The second rotor is positioned at the leading edge of a diffuser with radius increasing with distance from the second rotor. The modules are rotatably mounted on the tower so that they can yaw and maximize air flow through the turbines and channels.

Ersoy shows a plurality of vertically-oriented sails attached to a rotor that drives a generator. Each sail houses a plurality of flaps that are pivotable about their upper edge and are constrained to pivot within a 90-degree range. When wind strikes a "positive" face of a sail, the flaps assume a "closed" or vertically downward position so that the wind urges the sail to turn the rotor. When wind strikes a "negative" face of a sail, the flaps assume an "open" or horizontal position, allowing the wind to pass freely therethrough. The flaps on each sail open and close according to their position relative to the wind direction, thus urging the rotor to rotate and generate electricity.

Cumings shows a fluid turbine device comprising a rotatable vertical blade assembly with a plurality of blades that are mounted on a shaft and housed within an angularly positionable, partially open, shaped shroud. As fluid flows past the entire assembly, the shroud's shape causes the shroud to assume a position such that the fluid flow is diverted away from the return path of the blades as the blade assembly rotates, thereby improving efficiency of the overall unit. The shaft is connected to a generator for the production of electricity.

Tsitron shows an apparatus for generating electricity that includes a turbine, a generator connected to the turbine. A wind-guiding device includes an inclined plane surrounded by side walls. The device intercepts a horizontal flow of wind and the inclined plane diverts the flow of wind upward to drive a vertically-oriented turbine at the top of the device.

Chio shows a tower type vertical axle windmill. A plurality of layers are stacked in an external housing with computer-controlled louvers in its exterior walls. Each layer includes a wind turbine connected to a generator for the generation of electricity. The wind turbines comprise a plurality of arms with flaps that open or close, depending on their position relative to the wind in a manner similar to that of Ersoy, described above. The turbines also include a flywheel element to smooth out rotation and reduce vibration as the wind changes.

Sterling shows an injector venturi accelerated wind turbine. A venturi structure comprises a compression venturi inlet region, i.e., a cylindrical region with decreasing radius at an entrance, followed axially by a rear vacuum venturi region, i.e., a cylindrical region with increasing radius, at its outlet. A plurality of vents in the rear vacuum venturi region admit passing air to speed the flow of air as it leaves the device. A propeller, connected to a generator, is positioned at the juncture of the compression and vacuum regions. The venturi and vent assembly speed the flow of air to the propeller for an improvement in aerodynamic efficiency that increases the amount of energy extracted from the wind.

The above references all teach extraction energy from the wind. The following reference teaches the harvesting of solar energy for conversion to electricity.

Baird shows a solar venturi turbine that includes an upwardly oriented venturi tube supported by a venturi support skirt. The tube includes a vented, tapered thermopane glass enclosure that allows sunlight to pass therethrough and fall on a first, tapered centrifugal fan therewithin. A second, high-velocity fan is located above the first fan and a high-pressure compressor is located above the second fan. A turbine with a shaft is located above the high-pressure compressor section. The first and second fans and the turbine are located in the neck of the venturi. The turbine's shaft is connected to an electrical generator for producing electricity. A motor is used to start the apparatus.

The following references extract energy from both wind and sunlight.

Iskrenovic shows a dual wind-solar system comprising a wind turbine having a rotor with first vertically-oriented movable vanes with openable/closeable slats for extracting energy from wind that enters the apparatus horizontally, and second, horizontally-oriented vanes for extracting energy from upwardly flowing, heated air. The rotor is mounted on a shaft that is connected to an electrical generator. A vented base member is designed to trap heat from sunlight, heating the air within and reducing its density so that convection carries the air upward where it impacts the second, horizontally-oriented set of scoops. Wind air enters the side of the apparatus, imparting energy to the first set of scoops; thermal energy heats air in the base of the unit and sends air upward so that it imparts additional energy to the rotor via a second set of scoops. All the air exits at the top of the apparatus.

Comandu shows a wind and solar energy collection system. A self-standing vertical structure resembles a very high chimney with a very large base. At the base is an air inlet for capturing wind. At the top of the chimney is an air outlet. Air, both ambient air and wind, is admitted through the air inlet at the base and expelled through an exit at the top of the chimney by wind force and convection. A battery of electrical generators powered by propellers is positioned within the base in one embodiment or the chimney in another embodiment. Air moving within the structure causes the propellers to turn and drive the generators in order to generate electricity. An optional bank of burners can add energy to increase air flow at or near the base of the structure and reduce electrical output variations. An optional bank of solar collectors contains a hydraulic fluid that is pumped through radiators at or near the base of the structure to further increase output. The burners and pumps are under computer control. The base of the structure is optionally heated by sunlight, adding additional energy to the flowing air stream. A drawback of this system includes the use of burners since they consume energy, rather than producing it.

Lee shows variations on a hybrid vertical axis energy apparatus that harnesses multiple sources of energy including wind, solar (as in solar cells), and thermal updraft. His units can be connected together to increase electrical output. Each unit comprises a large, cylindrical portion that rotates on an axial shaft that is connected to a generator. The top of the cylinder is domed and covered with solar cells. The outside surface of the cylinder is lined with vertical flashings for intercepting wind. The inner volume of the cylinder contains a corkscrew-like ducting that adds to the rotational momentum of the apparatus when thermal air currents are provided from below. A motor powered by the solar cells is used to start the apparatus. Lee's vertical air flow path urges his entire apparatus to rotate. When wind is blowing horizontally but there is no thermal updraft, Lee will be inefficient because rotation of the entire apparatus will force vertical flow of air through the corkscrew ducting, thereby wasting energy.

Lucy shows a wind energy system with structure similar to that of Cumings that is described above. In one embodiment, a teardrop-shaped housing with front, rear, and side surfaces is rotatably supported on a vertical shaft. The housing resembles a right-circular cylinder that has been deformed by squeezing two opposite sides inward toward one-another so that the front surface narrows to a vertical line, while the rear surface retains most of its original shape. The side surfaces form gradual contours from the front to the rear surface. Openings are cut into the side surfaces and vertical air turbine rotors are installed therein so that a radial portion of the rotor extends outside the side surface and is exposed to the wind while the remaining radial portion of the rotor extends inward from the side surface and is protected from the wind. Each rotor is connected to an electric generator. When wind is present, the narrow front surface of the teardrop-shaped housing points into the wind and air passes along the side surfaces where it strikes the exposed blades of the vertical turbines, urging them to turn.

Young shows an offshore, on-sea, compound renewable power plant that produces electricity by extracting energy from sunlight, wind, waves, ocean thermal gradients, and tides. A vertical axis wind power generator is included. Further capabilities include an electrolysis-based hydrogen generating system, a seawater desalination system, and a biomass diesel generation system. A plurality of marine platforms supporting apparatus with these capabilities is envisioned. The output of all sources can be combined. While ambitious, this system suffers from the uncertainties of waves due to storms and the like.

Lockwood, Wohr, Quinn, Decker, Bair, Gaston, Boone, Diederich, Iskrenovic, and Ersoy all show single apparatuses, each with many component parts. Failure of a single part can cause the entire generating apparatus to stop functioning. An alternative is to have a single apparatus that comprises a plurality of power generating units so that failure of one or two units will not significantly impact overall power output of the whole apparatus.

Wind-only devices produce output only when wind is present. Solar-only devices produce output only when the sun shines on them with sufficient intensity. Wind and solar devices can be configured to surmount these difficulties, producing more output under varying conditions.

While each of the above systems may be suited for their particular use, all have one or more deficiencies as noted.

SUMMARY

I have discovered a new land-based design for a solar and wind energy extraction system that overcomes some limitations of the prior art. No motors, burners, or pumps are required. In one aspect an apparatus combines a solar collection system and a wind collection system that operate independently. In another aspect, the solar collection system is aided by wind collection, however the two methods for extracting energy from wind and sun still operate independently of one-another. The wind collection system comprises a plurality of independent rotor-and-generator units so that if one unit fails, the system can continue to operate at near-full output. In other aspects, my wind and solar collection systems are self-starting.

| REFERENCE NUMERALS | | | |
|---|---|---|---|
| 100 | Rotor or turbine | 105 | Post |
| 110 | Beam | 115 | Flow Containment Tower |
| 116 | Inlet | 117 | Outlet |
| 120 | Windowed region | 125 | Earth |
| 130 | Salt or heat absorbent material | 135 | Pipe |
| 140 | Pump | 145 | Fan |
| 150 | Generator | 151 | Clutch |
| 155 | Strut | 160 | Fan |
| 165 | Cup | 170 | Arm |
| 700 | Shaft | 705 | Wing |
| 710 | Arm | 715 | Bearing |
| 720 | Pulley | 725 | Generator |
| 726 | Leads | 727 | Controller |
| 728 | Load | 730 | Transmission |
| 735 | Pulley | 740 | Link |
| 800 | Flap | 805 | Pivot |
| 810 | Spring | 815 | Stop |
| 1000 | Lines | | |

DESCRIPTION—FIRST EMBODIMENT—EXTRACTING ENERGY FROM SUNLIGHT—FIGS. 1 TO 5

Figure 1:
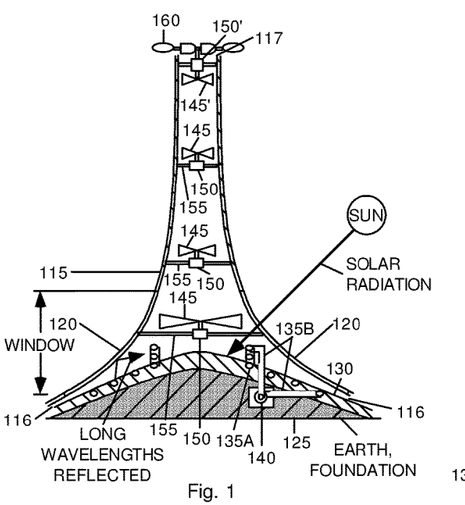
FIG. 1 is a side, cut-away view of a first aspect of a basic power generator.

FIG. 1 is a side, cross-sectional view of a power generator or converter that is designed to extract energy from sunlight and wind. The main part of the generator is an inverted funnel-shaped, columnar structure or flow containment tower 115. A window or transparent region 120 (the bottom portion of tower 115 as indicated by the "Window" label) is transparent and the top portion above the window region is opaque. Region 120 is made of a material that passes solar radiation to the inside of tower 115 and traps longer wavelengths generated therein as the solar radiation is converted to heat, in a well-known fashion, known as the greenhouse effect. One or more air inlets 116 permit air from outside tower 115 to enter the region inside tower 115. An air outlet 117 at the top of tower 115 permits air to leave tower 115.

In one version of the present aspect, a layer of earth 125 beneath tower 115 supports a layer 130 of heat absorbent material such as sodium chloride (salt), dark metal filings, and the like overlaid on earth 125. Layer 130 is used to trap heat that is generated by solar radiation that passes through window region 120 of tower 115. Earth 125 beneath salt layer 130 also traps and stores heat that is conducted through layer 130. Layer 130 is preferably made black in color, e.g., by the addition of a black material such as carbon, so as to absorb as much as heat as possible. Alternatively, a black layer of material such as carbon can be applied to the top of layer 130 with a similar result. In an alternate aspect, layer 130 is omitted and earth layer 125 remains and is optionally coated with or mixed with a dark pigment, such as carbon.

Air adjacent earth layer 125, salt layer 130, and pipe 135 are heated by solar radiation. In response, the density of the heated air decreases and the air rises convectively within tower 120.

A plurality of fans or turbines 145 (FIGS. 1 and 3) are connected to generators 150 and these are secured within tower 115 in vertically spaced positions by a plurality of struts 155. The diameter of each fan 145 is predetermined to be less than but very nearly equal to the inner diameter of tower 115 so that rising air within tower 115 urges fans 145 to turn instead of merely bypassing fans 145, as described below.

An additional fan 145' and generator 150' are located near the top of tower 115. In this case, the shaft of generator 150' is also connected to an external fan or turbine 160 (FIG. 4) above tower 115. In one alternative aspect, generator 150' is similar to generators 150 except that it includes a one-way clutch 151 (FIG. 5) between fan 160 and generator 150' that permits fan 145' and the shaft of generator 150' to rotate faster than fan 160. This ensures that fan 160 will not cause a drag on the rotation of fan 145' in the event there is little or no wind available to turn fan 160.

Figure 2:
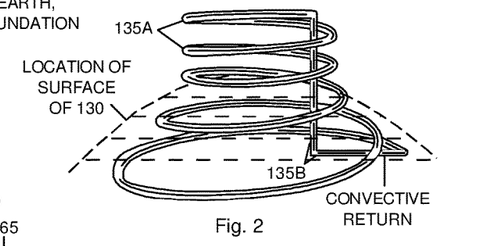
FIG. 2 is a perspective view of a heat absorbing enhancer used in the generator of FIG. 1.

FIG. 2 is a perspective view of an addition to the generator of FIG. 1. The addition is a heat-absorbing enhancer pipe having a helical portion or section 135A and a return portion or section 135B. Section 135B contains a heat-trapping fluid, such as lightweight heat-tolerant oil, that further increases the heat-trapping capability of tower 115. Section 135A has a spiral shape that is submerged within layer 130 at the outer portion of the spiral and rises above layer 130 at the inner portion of the spiral. Section 135B is a return path for oil from the center of spiral pipe 135A to the outer portion of section 135A. In one aspect of this addition, a pump 140 (FIG. 1) circulates the heat-trapping oil through pipe sections 135A and 135B. In another aspect of this addition, pump 140 is eliminated and natural convection causes the hottest portion of the heat-trapping oil to rise to the top of section 135A where it cools and then returns to the lowest level of section 135A via section 135B (FIG. 2).

Figure 3:
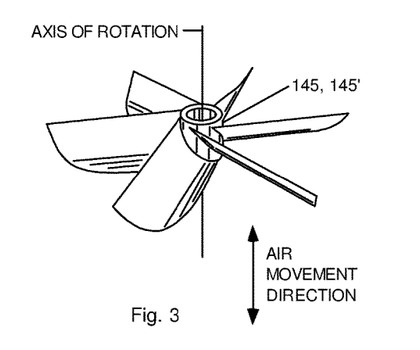
FIGS. 3 and 4 are perspective views of fans or turbines used in the system of FIG. 1.

FIG. 3 is a perspective view of one of fans or turbines 145. All of turbines 145 have angled blades and are designed to turn when urged by air that moves parallel to their axis of rotation.

Figure 4:
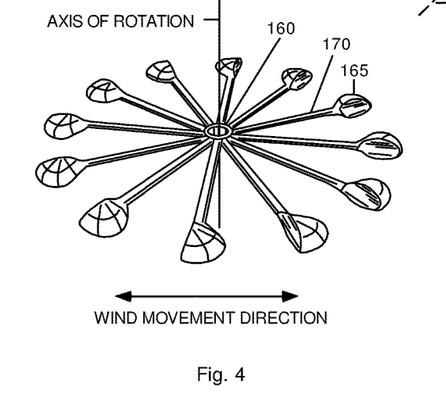

FIG. 4 is a perspective view of turbine 160 which, as stated, is mounted atop tower 115. Turbine 160 comprises a plurality of cups 165 that are each secured to a spoke or arm 170. Six cups 165 and arms 170 are shown, but more or fewer can be used. Turbine 160 is designed to turn when urged by air that moves perpendicular to its axis of rotation.

The upper part of tower 115 can be made of (a) concrete, (b) a concrete composite material containing air, fiberglass, plastic beads, and the like, (c) metal, (d) a lightweight metal composite, or (e) a plastic composite or the like. Transparent bottom part or window 120 is made of glass or a rugged plastic like polycarbonate. The bottom part of tower 115 rests on earth or on a foundation, as indicated in FIG. 1. Fans 145 and 160 are made from metal, plastic, and reinforced composite plastic materials. Generators 150 are connected to a power control unit (not shown) that combines their output and transmits it to a power grid (not shown). Pipe 135 is made of iron, steel, aluminum, or a metal alloy.

Tower 115 can be about 1 km (0.62 mile or 3281 feet) tall and has diameter of about 1 km at its base, although other sizes can be provided.

First Aspect—Operation—FIG. 1

During daylight hours, solar radiation passes through window portion 120 and strikes layer 130, warming it. As the air near layer 130 becomes warmer than the air further up in tower 115, convective forces will urge the air to move upward inside tower 115. Air moving upward inside tower 115 passes through the volume occupied by fans 145 and urges them to rotate, in turn rotating the shafts of generators 150 and generating electricity.

Pipe arrangement 135 and the heat-trapping fluid absorb heat from salt layer 130 and conduct this heat to the center of tower 115, further warming the air and increasing convective forces there.

Self-Starting Feature.

Figure 5:
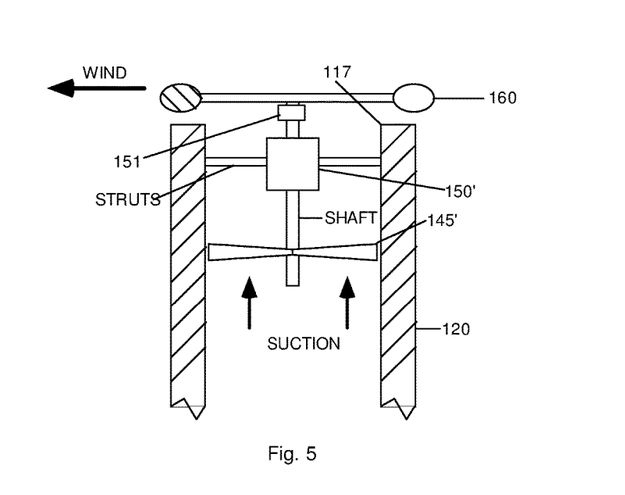
FIG. 5 is a schematic view of a self-starting mechanism of the system of FIG. 1.

FIG. 5 is a schematic side cross-sectional view of turbine 160, generator 150', and turbine 145. An optional clutch 151 is described above. If the solar collecting system has lain idle in cold conditions, on a winter night for example, cold air near the interior top of tower 115 will be of sufficient density to prevent the upward convection of air within tower 115, i.e., a temperature inversion exists. This condition will prevent or at least delay the starting of upward air flow within tower 115. This situation is remedied by the combination of exterior turbine 160 and turbine 145' at exit 117 of tower 115.

Prevailing winds urge turbine 160 to rotate, in turn rotating turbine 145' since they share the same shaft. Turbine 145' is oriented so that as turbine 160 rotates, turbine 145' urges air near the top of tower 115 to leave via exit 117, thereby removing the temperature inversion in the air within tower 115. Free convection now occurs throughout the interior of tower 115, from bottom to top.

Energy is thus extracted from sunlight by admitting solar energy to the interior of tower 115 through window 120. The solar energy heats layer 130, pipe arrangement 135, and earth 125. As it becomes warmer, air in the vicinity of layer 130 decreases in density compared to the air further up inside tower 115 and convective forces urge the air upward past fans 145 and out through exit 117, causing fans 145 to rotate, in turn rotating the shafts of generators 150 and generating electricity. New air is admitted through vents 116 at the bottom of tower 115, allowing the process to continue.

Second Aspect—Description-Apparatus for Extracting Energy From Wind—FIGS. 6 to 12

Figure 6:
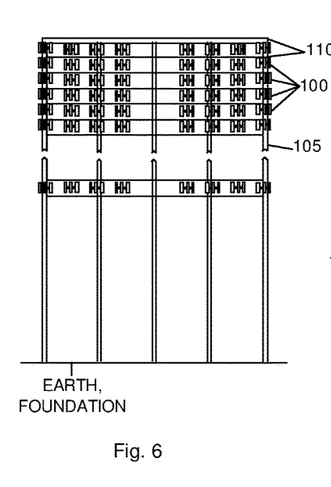
FIG. 6 is a partial side view of a second aspect of the basic power generator.
Figure 7:
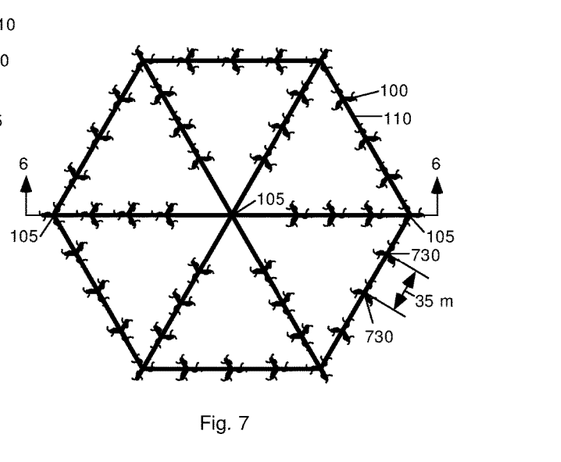
FIG. 7 is a top view of the second aspect shown in FIG. 6.

A second aspect of the present system is also shown in the cut-away, side, or elevational view of FIG. 6 and the top or plan view of in FIG. 7. The structure of FIGS. 6 and 7 has seven vertical posts 105 (six forming a hexagonal perimeter and one in the center). FIG. 6 is taken at a vertical plane as indicated by the line 6-6 in FIG. 7 and shows the center plane including the three posts in this plane, plus the two posts that bound the top side of FIG. 7. FIG. 7 shows the full, hexagonal arrangement of the various components comprising the present aspect.

In the present aspect, the seven vertical posts, poles or pylons 105 are spaced and parallel. Each adjacent two posts support a plurality of horizontal beams 110 extending between the posts. As shown in FIG. 7, the posts of each pair have a different alignment from the posts of any other adjacent pair so that a line between the posts of any pair has a different orientation that a line between the posts of any adjacent pair. Rotors or turbines 100 are layered in vertical groups between adjacent beams 110, as indicated in FIG. 6. Beams 110 are horizontally oriented and are parallel to each other and have successively higher heights. Each pair of beams has plural turbines mounted therebetween so that their axes of rotation (FIG. 8) extend between the beams of each pair. The beams of each side of the hexagonal structure (FIG. 7) and their turbines are aligned vertically when seen from above. The six outer sides form six obtuse angles between adjacent sides and the six internal radial sides extend from a common center junction, where each side or set of beams has a multiplicity of horizontal beams with turbines between the beams of each pair. Each side or set of beams is mounted at an angle to its adjacent set or side when seen from above. Each level comprises a wheellike structure having six radial beams or spokes extending out from the common center junction to the six outside beams. which are arranged to form a six-part hexagonal rim.

Each layer of beams 110 may have 42 turbines, and each turbine may consist of a group of three wings (described below), although larger or smaller groups can be used. These groupings are shown in FIGS. 6 and 7.

Figure 8:
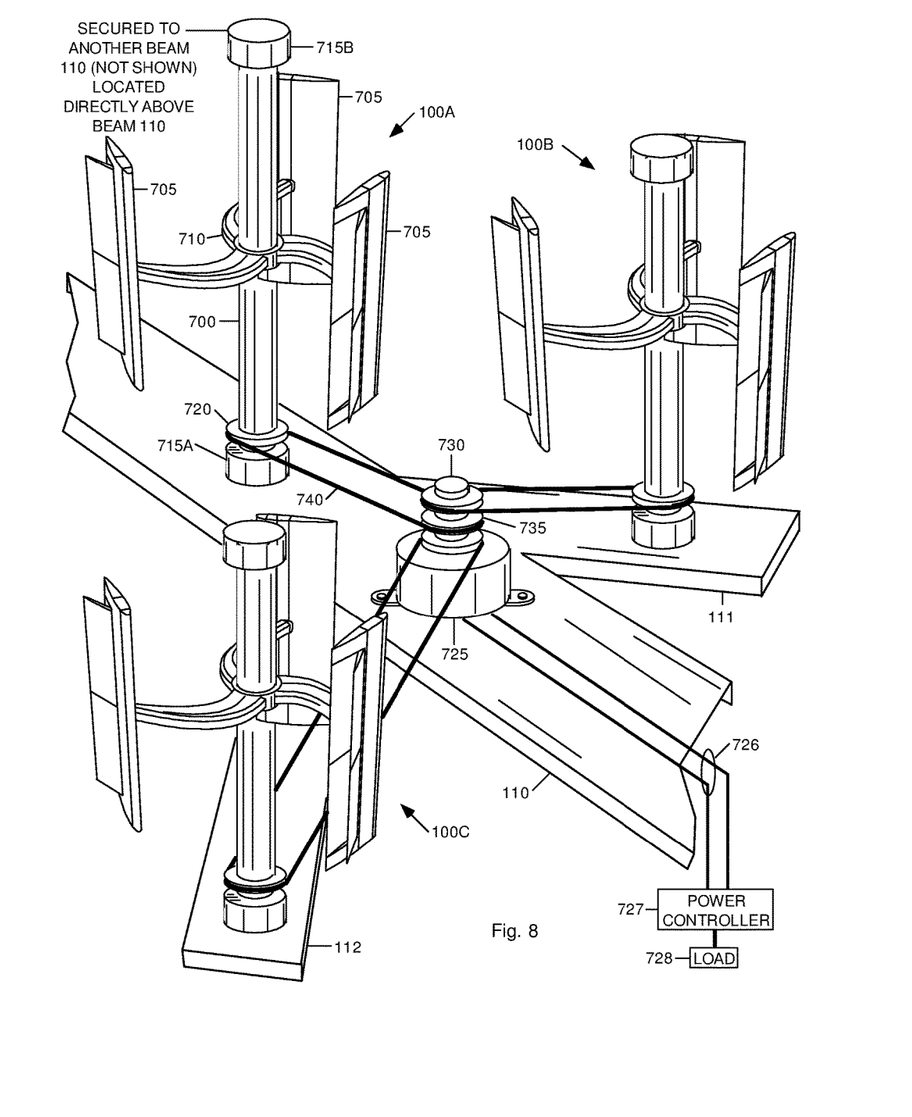
FIG. 8 is a perspective view of a group of rotors or turbines according to the second aspect.

FIG. 8 is a more detailed perspective view of a grouping of three turbines 100 as they are mounted on a portion of one of beams 110. Each turbine comprises a shaft 700, a plurality of wings 705, and an arm assembly 710 that is rigidly secured to shaft 700 at its center and each of wings 705 at the distal end of each arm. A first rotary bearing assembly 715A is rigidly secured to beam 110. The lower end of shaft 700 is inserted into and supported by bearing 715A. A second bearing assembly 715B is secured to another of beams 110 (not shown here for clarity) that lies directly above the beam 110 to which bearing 715A is secured. Bearing 715B is positioned directly above bearing 715A. The upper end of shaft 700 is inserted into bearing 715B. Shaft 700 freely rotates in bearings 715A and 715B. A pulley 720 is firmly secured to shaft 700 a predetermined distance above bearing 715A and beneath the lower edge of wings 705.

An electrical generator 725 is secured to beam 110 a predetermined distance from bearing 715A. A plurality of electrical leads 726 deliver energy from generator 725 to a power controller 727 for further distribution to an electrical load 728. A shaft (not shown) extends upward from generator 725. A transmission assembly 730 is secured to and concentric with the shaft of generator 725. Transmission 730 operates in a manner that equalizes the contribution of torque (discussed below) contributed from each of turbines 100A, 100B, and 100C to the shaft of generator 725.

A linking element 740, such as a durable, flexible belt or chain, wraps securely around pulleys 720 and 735. In the case of a belt, pulleys 720 and 735 are sheaves, i.e., they have a grooved rim; in the case of a chain, pulleys 720 and 735 have sprockets.

Two additional turbine assemblies 100B and 100C are ganged together with turbine 100A and connected to respective pulleys that are secured to transmission 730. A triangular arrangement is shown in this example, although other arrangements can be used. Two beam sections 111 and 112 extend at predetermined angles from beam 110 and support rotor assemblies 100B and 100C, respectively, in the same manner as for rotor 100A.

Wings 705 are 25 m tall, with their other dimensions scaled as shown in FIG. 7. Arms 710 are of a predetermined length so that the diameter of the circular path of wings 705 is 45 m. Beams 110 are spaced apart 35 m vertically and turbines 100A, 100B, and 100C are spaced horizontally approximately 35 m from one-another. The center of each group of three turbines (100A, B, and C) is at shaft 730 of generator 725. The shafts 730 of each group are separated by 35 m, as can be best seen in FIG. 6. These dimensions are representative and other dimensions can be used. Shafts 700, arms 710, and pulleys 720 are made of a sturdy metal and may alternatively be made of a reinforced, high-strength plastic composite such as that sold under the trademark Zytel, by E.I. DuPont de Nemours of Wilmington, Del., USA. Wings 705, including flaps 800, can also be made of lightweight metal or a high-strength plastic composite material.

Generator 725 and the capacity of power controller 727 are sized according to the maximum torque and speed delivered to the shaft of generator 725, via transmission 730, by turbines 100A, 100B, and 100C in high-wind conditions.

Second Aspect—Operation—FIGS. 8 to 13

When turbines 100 (FIG. 7) are initially exposed to wind passing perpendicular to shafts 700 (FIG. 8) there is in general no impetus for the turbines to turn in any particular direction since a first of wings 705 is facing partially into the wind, a second of wings 705 on the same turbine is facing partially away from the wind, and the third of wings 705 is generally perpendicular to the wind. A starting mechanism is provided in the wings to initiate rotation of turbines 100 in a predetermined direction. FIGS. 8 through 13 show one such starting mechanism.

Wing Detail—Self-Starting Aspect—Description and Operation—FIGS. 8 through 12.

Figure 9:
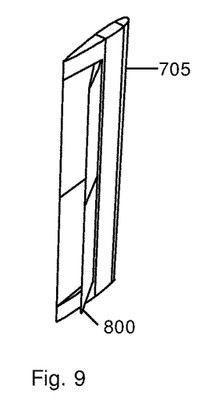
FIGS. 9 to 13 show details of a wing which aids the second aspect in self-starting.
Figure 10:
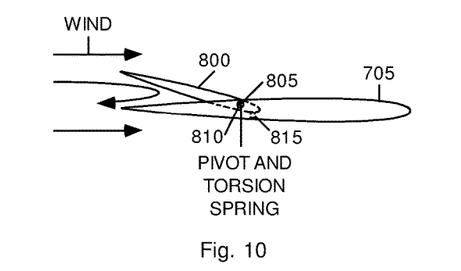
Figure 11:
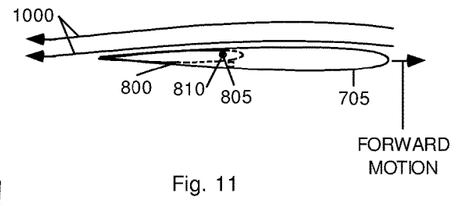
Figure 13:
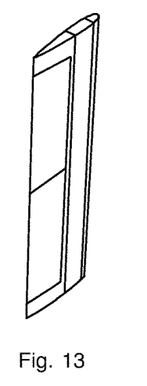

FIG. 9 shows a perspective view of one wing 705 with a movable flap 800. Flap 800 is pivoted in wing 705 so that it can be in the open position at an angle to wing 705 (FIGS. 9 and 10) or it can pivot to nest into the body of wing 705 near its trailing edge (FIGS. 11 and 13). The middle of flap 800 includes a pivot shaft 805 that runs through flap 800 and has ends that are secured to the ends of wing 705. A torsion spring 810 surrounds pivot 805 and bears on both flap 800 and wing 705 and is arranged to urge flap 800 to the normally open or up position (FIGS. 9 and 10). A stop 815 is positioned to stop the rotation of flap 800 at a maximum angle of about 20 degrees to the wing.

When there is no wind, a means comprising spring 810 urges flap 800 to rotate to its uppermost or open position about pivot 805 (FIGS. 9 and 10). When wind strikes one of wings 705 at its trailing edge, raised or open flap 800 and the body of wing 705 trap or block wind. The air thus urges wing 705 to move forward, i.e., to the right in FIG. 10, or counter-clockwise when FIG. 8 is viewed from above, thereby urging turbine 100 to rotate. As turbine 100 rotates, the remaining two wings 705 are sequentially oriented so that their flaps 800 also trap wind, eventually causing turbine 100 to spin at higher and higher speeds. As wing 705 rotates, the open position of flap 800 produces a drag on the rotary motion of the wing. Since flap 800 is no longer needed to accelerate wing 705 in a forward direction in its circle of rotation, it can now be lowered to improve the efficiency of turbine 100 as it turns.

FIG. 11 shows a side view of wing 705 moving forward in its circle of rotation above a predetermined speed. Laminar flow of the air, i.e., flow that is layered on the surface of wing 705, indicated by lines 1000, urges flap 800 to pivot downward against wing 705, overcoming the torque exerted by spring 810. The predetermined speed is determined at least by the area of flap 800, the shape of wing 705, and the amount of torsion produced by spring 810.

Figure 12:
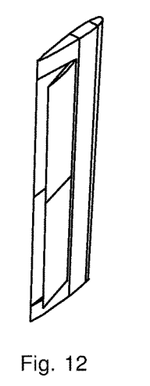

In FIG. 12 wing 705 is moving forward at an intermediate speed with the flap partially lowered. FIG. 13 is a perspective view of wing 705 shown moving above the predetermined speed that causes flap 800 to fully lower into the body of wing 705.

Thus when there is no wind, turbines 100 in FIGS. 6 to 8 are stationary. At low wind speeds, flaps 800 block a part of the air flow striking the back of wing 705, thereby urging wing 705 forward in its circle of rotation (FIG. 10) so that the turbine rotates. As each subsequent wing 705 rotates into the same position, its flap blocks air flow and turbine 100 is accelerated to the predetermined rotational speed. Above this speed, flaps 800 serve no purpose and in fact cause drag on the forward motion of wings 705. Laminar flow of air over wing 705 urges flaps 800 to overcome the torque exerted by spring 810 so that flaps 800 are urged to their full lower position within wing 705 (FIG. 11). When the wind speed decreases and turbines 100 turn at a speed below the predetermined speed, springs 810 in flaps 800 again rotate the flaps to their upper or open position (FIGS. 9 and 10). Flaps 800 in wings 705 thereby operate to provide a self-starting feature for turbines 100.

Figure 14:
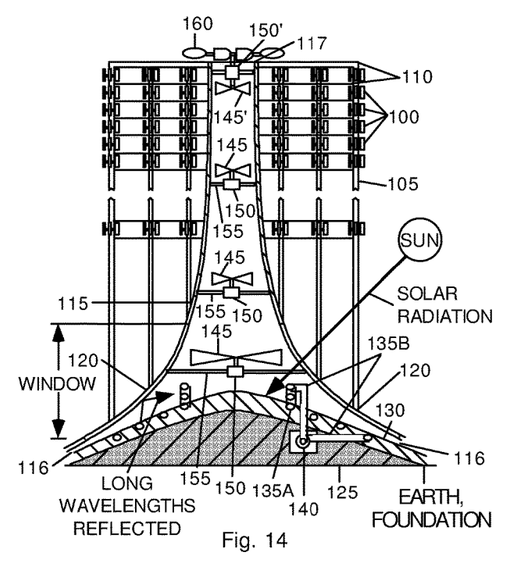
FIG. 14 shows the power generator using the first and second aspects combined.

DESCRIPTION AND OPERATION—COMBINED FIRST AND SECOND ASPECTS—FIG. 14

FIG. 14 shows a cross-sectional, cutaway view of the first and second aspects combined. This arrangement combines the poles and fans of FIG. 6 with the tower arrangement of FIG. 1. It conserves space and combines some structural elements for extra strength. For example, posts 105 are either supported by tower 115 or they pass through column 115 on the way to the ground or foundation at the bottom of the two towers. The uppermost portions of beams 110 are coplanar with the top of column 115 so that wind can freely turn turbine 160. As mentioned, FIG. 7 shows the placement of turbine 160 and exit 117 of column 115 with respect to the groupings of rotors 100.

CONCLUSIONS, RAMIFICATIONS, AND SCOPE

I have provided an improved electrical power generating system and method. An inverted funnel-shaped, columnar tower that extracts energy from sunlight is surrounded by a plurality of rotors arranged in groups that extract energy from wind. In one aspect, both systems are self-starting and do not rely on the application of external motive power. A significant advantage of the combined systems is the potential for delivery of electrical energy over 24 hours; the two systems operate independently of one-another. Solar-powered apparatuses deliver energy only in strong sunlight while wind-powered apparatuses can deliver at night or on cloudy days. The height of the wind energy capturing system places rotors where winds are strong and blow throughout much of a 24-hour period. The design of the wind turbines is such that they do not require reorientation in order to face into the wind, i.e., the wind can approach the turbines from any direction with equal effect.

While the above description contains many specificities, these should not be construed as limitations on the scope, but as exemplifications of some present embodiments. Many other ramifications and variations are possible using the system and methods described. For example, turbines in the wind-capturing aspect can be grouped in numbers other than three. Each turbine can have a dedicated generator. More or fewer fans with more or fewer blades can be used in the solar energy capturing aspect. The sizes of the entire assemblies as well as most parts can be made larger or smaller. The materials can be changed from those indicated and the shapes of most parts can also be modified.

Thus the scope should be determined by the appended claims and their legal equivalents, rather than the examples and particulars given.

The invention claimed is:

1. A turbine array for converting energy from wind to mechanical energy, comprising:
   a mounting structure comprising a first set of three horizontally oriented beams generally parallel to each other and having successively higher heights and including a first and lowermost beam at a lowermost level, a second and middle beam at a middle level, and a third and uppermost beam at an uppermost level; said first and second beams constituting one pair and said second and third beams constituting a second pair,
   a first and lower plurality of wind-responsive turbines mounted between said first pair of beams, each turbine having an axis of rotation and extending from said first beam to said second beam,
   a second and upper plurality of wind-responsive turbines mounted between said second pair of beams, each turbine having an axis of rotation and extending from said second beam to said third beam,
   said three beams and said first and second plurality of turbines being aligned vertically when seen from above,
   whereby said turbines will be mounted in the path of wind so as to provide three levels of turbines that convert wind energy to mechanical energy.

2. The turbine array for converting energy from wind to mechanical energy of claim 1 wherein:
   said mounting structure further includes second and third sets of three horizontally oriented beams per set,
   each of said second and third sets of three horizontally oriented beams including a lower and an upper plurality of wind-responsive turbines mounted as in said first set of three horizontally oriented beams,
   said second set of three horizontally oriented beams being mounted at an angle to said first set of three horizontally oriented beams when seen from above, and said third set of three horizontally oriented beams being mounted at an angle to said first and second sets of three horizontally oriented beams when seen from above,
   whereby said turbines of one of said sets will face the wind in an optimal manner, regardless of wind direction.

3. The turbine array for converting energy from wind to mechanical energy of claim 1 wherein:
   said mounting structure further includes eleven additional sets of three horizontally oriented beams per set, for a total of twelve sets of three horizontally oriented beams,
   each of said additional eleven sets of three horizontally oriented beams including a lower and an upper plurality of wind-responsive turbines mounted as in said first set of three horizontally oriented beams,
   said twelve sets of three horizontally oriented beams per set being mounted in a hexagonal array with three levels,
   each level of said three-level hexagonal array having six outside beams joined end-to-end at six junctions that form six obtuse angles, and six inner beams which each extend in from a respective junction of said six outside beams to a common center junction, so that each level comprises a wheellike structure having six radial beam spokes extending out from said common center junction to said six outside beams arranged to form a six-part rim,
   whereby the turbines of one side of said three-level hexagonal array will face the wind in an optimal manner, regardless of wind direction.

4. The turbine array for converting energy from wind to mechanical energy of claim 1 wherein:
   said mounting structure further includes at least five additional sets of three horizontally oriented beams per set, for a total of at least six sets of three horizontally oriented beams per set,
   each of said five additional sets of three horizontally oriented beams including a lower and an upper plurality of wind-responsive turbines mounted as in said first set of three horizontally oriented beams,
   each of said at least six sets of three horizontally oriented beams per set being mounted at a different vertical height so as to from a ladder-like vertical array of turbine-holding beams,
   whereby said turbines will be mounted in the path of wind so as to provide at least six levels of turbines that convert wind energy to mechanical energy.

5. A system for extracting energy from wind, comprising:
   a wind-turbine-holding structure and a first set of at least four wind-responsive turbines supported by said structure, each of said turbines having an axis of rotation and arranged to convert wind energy into mechanical rotational energy,
   said structure arranged to support said turbines at two different vertical levels, each of said levels having two of said turbines which are spaced apart horizontally,
   said structure comprising a pair of vertical posts and three horizontal beams connected between said posts, two of said turbines being mounted between a lower pair of said beams and two of said turbines being mounted between an upper pair of said beams,
   said turbines of each vertical level being aligned vertically with the turbines of the other vertical level when seen from above,
   whereby said turbines will be mounted in the path of wind and will be arranged to receive wind energy over an area having vertical and horizontal dimensions.

6. The system for extracting energy from wind of claim 5 wherein said turbines each comprise a vertically mounted rotatable axle having a plurality of radial spoke arms extending out from said axle, each spoke arm having a wind responsive member mounted at a distal end thereof, said wind responsive member being selected from the class consisting of cups and wings that are arranged to urge the axle to which it is connected to rotate in response to a horizontal wind.

7. The system for extracting energy from wind of claim 5 wherein said structure is arranged to support second and third sets of at least four turbines each, the turbines of said second and third sets being arranged between additional sets of vertical posts and horizontal beams similar to those of said first set, said second set being mounted at an angle to said first set when seen from above and said third set mounted at an angle to said first and second sets when seen from above.

8. The system for extracting energy from wind of claim 5 wherein said structure comprises four vertical posts that are parallel and spaced apart from each other to provide at least three pairs of posts, the posts of each pair having a different alignment from the posts of any other pair when seen from above so that a line between the posts of any pair has a different orientation that a line between any other pair, the posts of each pair of said three pairs of posts having three horizontal beams connected therebetween, with each pair having two turbines of the type described being mounted between a lower pair of the three beams of said pair and two turbines of the type described being mounted between an upper pair of the three beams of said pair.

9. The system for extracting energy from wind of claim 8 wherein said structure further includes two additional posts for a total of six posts, said six posts being parallel and arranged, so that when seen from above said six posts define the corners of a hexagon, said six posts providing six pairs of posts, the posts of each pair of said six pairs of posts having three horizontal beams connected therebetween, with each pair having two turbines of the type described being mounted between a lower pair of the three beams of said pair and two turbines of the type described being mounted between an upper pair of the three beams of said pair.

10. The system for extracting energy from wind of claim 9 wherein the posts of each pair of said six pairs of posts have at least five horizontal beams connected therebetween to form four pairs of beams, with each pair having two turbines of the type described being mounted between each pair of beams so that each of said six pair of beams has eight turbines mounted therebetween.

\* \* \* \* \*